UNITED STATES PATENT OFFICE.

MENDAL W. WILLSON, OF MOUNT CARMEL, ILLINOIS, ASSIGNOR OF ONE-THIRD TO HENRY LITTIG AND ONE-THIRD TO ZED MOORE, OF MOUNT CARMEL, ILLINOIS.

PROCESS OF REMOVING AND PREVENTING BOILER-SCALE.

1,223,547.     Specification of Letters Patent.     Patented Apr. 24, 1917.

No Drawing.     Application filed August 25, 1916. Serial No. 116,836.

*To all whom it may concern:*

Be it known that I, MENDAL W. WILLSON, a citizen of the United States, residing at Mount Carmel, in the county of Wabash and State of Illinois, have invented certain new and useful Improvements in the Process of Removing and Preventing Boiler-Scale, of which the following is a specification.

My invention relates to improvements in cleaning compounds, and more particularly to what is commonly known as "boiler cleaning compounds", and the process of applying and using the same the improved compound being particularly designed and adapted for use in boilers not only for dissolving and removing what is commonly known as "scale" or similar deposits on the interior surface of boilers but also acting to prevent future accumulations or deposits.

The improved compound may be made up and used either in a liquid or in a dry or powdered state, the compound for use in the boiler after the latter has been thoroughly cleaned by the primary compound, and for preventing future accumulations, however, being slightly modified as to its ingredients and method of application as hereinafter specified.

The main or primary boiler cleaning compound comprises the following ingredients, combined and used in substantially the proportions hereinafter stated, to wit: (1) catechu; (2) soda-ash; (3) blue vitriol; (4) zinc; and (5) Irish potatoes.

The secondary or scale preventing compound comprises catechu and zinc, the other ingredients mentioned in the primary or main compound being omitted and the catechu being used in a larger proportion as hereinafter stated.

The compounding of the primary or dissolving compound.

The primary or main compound may be made up and used as follows: To make fifty (50) pounds of liquid compound, or fifty (50) pounds in a dry state, the ingredients may be compounded as follows, and in substantially the proportions stated:

(1) Thirty-five (35) pounds catechu,—dried and ground from the crude gum, and dissolved by boiling in water,—for use in the liquid state; or simply dried by cold air and ground to a powder,—for use in the dry or powdered state, as hereinafter mentioned.

(2) Ten (10) pounds of soda-ash dissolved with (1) after boiling for use as a liquid, or mixed in powdered form for use in dried form.

(3) One-half ($\frac{1}{2}$) pound blue vitriol dissolved with one (1) and two (2) for liquid,—or mixed in powdered form for use in a dry state;

(4) One-half ($\frac{1}{2}$) pound commercial zinc, preferably in the form of zinc metal dissolved by the electrical process of depositing in water by electrolysis in a quart of water, the sediment to be left in the water and mixed with (1)—(2) and (3) (for liquid); or the water to be evaporated leaving powder to mix (for dry);

(5) Four (4) pounds of Irish potatoes ground and mixed with (1)—(2)—(3) and (4) (for liquid); or dried and pulverized into powder and mixed (for dry).

In making up the liquid compound the foregoing are added to forty-five (45) gallons of water and the latter boiled until all chemicals are thoroughly mixed and impregnated; or for a dry compound, or composition in the dry state, all of the powdered ingredients are thoroughly mixed and commingled.

The compounding of the secondary or scale preventing compound.

To make fifty (50) gallons in the liquid state, or fifty (50) pounds in the dry state, the following ingredients are used in substantially the proportions stated:

Forty-nine and one-half (49$\frac{1}{2}$) pounds crude gum catechu and one-half ($\frac{1}{2}$) pound commercial zinc; or zinc metal electrically dissolved as stated in four (4) (for liquid) or dried and ground to a powdered form (for dry).

The improved compound may be used as follows: For example, if the boiler be of one hundred (100) horse-power, twenty one (21) pounds of the powdered primary compound is introduced into the boiler (and in boilers of other horse-power in proportion) and after the scale or deposit has been dissolved and removed the secondary or scale preventing compound should be used at the rate of one (1) pound per hundred (100)

horse-power at intervals of about seven (7) days, after the boiler has been washed and refilled with fresh water, the liquid compound being used in the same manner except that it is applied in proportionate gallons and is fed into the boiler through the feed-water pump, or suitable appliance.

My improved compound has been found very efficient in that it removes the scale or accumulations by dissolving and without pitting the iron or corroding the connections and does not impregnate the steam.

Having thus described my improved compound, and a manner of compounding, and a method of applying the same, what I claim and desire to secure by Letters Patent, is,—

1. The process of removing and preventing boiler scale, consisting in impregnating the boiler water with (1) catechu, soda-ash, blue vitriol, zinc, and Irish potatoes, and (2) subsequently impregnating the same at intervals with catechu and zinc.

2. The process of removing and preventing boiler scale, consisting in treating the water in the boiler with (1) a composition of catechu, soda-ash, blue vitriol, zinc, and Irish potatoes, and (2) subsequently treating the same at intervals of about seven days with a composition of catechu and zinc all prepared and proportioned in substantially the manner stated.

In testimony whereof I have affixed my signature in the presence of two witnesses.

MENDAL W. WILLSON.

Witnesses:
WILLIAM BAGWELL,
RICHARD R. STANSFIELD.